United States Patent
Bonta et al.

(10) Patent No.: US 7,027,827 B2
(45) Date of Patent: Apr. 11, 2006

(54) METHOD AND APPARATUS FOR CHANNEL SHARING BETWEEN MULTIPLE COMMUNICATION SYSTEMS

(75) Inventors: Jeffrey D. Bonta, Arlington Heights, IL (US); Thomas V. D'Amico, Palatine, IL (US); George Calcev, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 97 days.

(21) Appl. No.: 10/440,761

(22) Filed: May 19, 2003

(65) Prior Publication Data

US 2004/0233888 A1   Nov. 25, 2004

(51) Int. Cl.
*H04B 15/00* (2006.01)

(52) U.S. Cl. .............. 455/502; 455/422.1; 455/435.3; 455/452.1; 455/452.2; 455/433; 455/450; 455/432.1; 370/350; 370/345; 370/310; 370/324

(58) Field of Classification Search .............. 455/454, 455/513, 509, 500, 515, 451, 452, 453, 452.1, 455/452.2, 502, 432.1, 422.1, 435.1–435.3, 455/433, 501; 370/350, 329, 345, 310, 324

See application file for complete search history.

(56) References Cited

U.S. PATENT DOCUMENTS

| | | | | |
|---|---|---|---|---|
| 5,862,487 A | * | 1/1999 | Fujii et al. ................... | 455/454 |
| 5,913,171 A | * | 6/1999 | Solonen et al. ............. | 455/502 |
| 6,023,626 A | * | 2/2000 | Kinnunen et al. .......... | 455/512 |
| 6,101,176 A | * | 8/2000 | Honkasalo et al. ......... | 370/335 |
| 6,163,698 A | * | 12/2000 | Leitch et al. ............... | 455/450 |
| 6,240,298 B1 | * | 5/2001 | Hayata ........................ | 455/511 |
| 6,330,429 B1 | * | 12/2001 | He ............................ | 455/67.11 |
| 6,374,115 B1 | * | 4/2002 | Barnes et al. ............... | 455/520 |
| 6,415,158 B1 | * | 7/2002 | King et al. ............... | 455/552.1 |
| 6,477,384 B1 | * | 11/2002 | Schroderus et al. ........ | 455/500 |
| 6,496,696 B1 | * | 12/2002 | Melnik ........................ | 455/446 |
| 6,580,909 B1 | * | 6/2003 | Carro .......................... | 455/450 |
| 6,591,103 B1 | * | 7/2003 | Dunn et al. ................. | 455/436 |

(Continued)

FOREIGN PATENT DOCUMENTS

WO    WO2003028395    4/2003

*Primary Examiner*—Sonny Trinh
*Assistant Examiner*—Khai Nguyen
(74) *Attorney, Agent, or Firm*—Kenneth A. Haas; Jeffrey K. Jacobs

(57) ABSTRACT

Remote units within a first communication system (121) utilizes frequencies (channels) from a second communication system (120) when placing a call. When a first remote unit (106) wants to call a second remote unit (107) using the channels, the first remote unit sends a base station (103) a list of top N traffic channel blocks from the second communication system along with the identity of the second remote unit. The base station then pages the second remote unit using a signaling channel reserved by second system. The second remote unit responds to the page with its list of best traffic channel blocks/chunks. The base station then picks the best overlap of idle channels from the list received by the remote units, and sends the list to the remote units instructing them use those traffic channels. Once the remote units receive the available channels, they can begin their call.

17 Claims, 2 Drawing Sheets

U.S. PATENT DOCUMENTS

| | | |
|---|---|---|
| 6,754,583 B1 * | 6/2004 | Verbil .................... 701/213 |
| 6,768,905 B1 * | 7/2004 | Goodjohn et al. .......... 455/423 |
| 6,850,744 B1 * | 2/2005 | Moore .................... 455/165.1 |
| 2002/0002052 A1 * | 1/2002 | McHenry .................. 455/447 |
| 2002/0146979 A1 * | 10/2002 | Regulinski et al. ........ 455/13.1 |
| 2003/0058830 A1 * | 3/2003 | Schmidt ................... 370/347 |
| 2003/0109261 A1 * | 6/2003 | Razavilar et al. .......... 455/452 |
| 2003/0134655 A1 * | 7/2003 | Chen et al. ............... 455/522 |
| 2004/0037247 A1 * | 2/2004 | Ngo ...................... 370/332 |
| 2005/0037755 A1 * | 2/2005 | Hind et al. ............... 455/435.3 |

\* cited by examiner

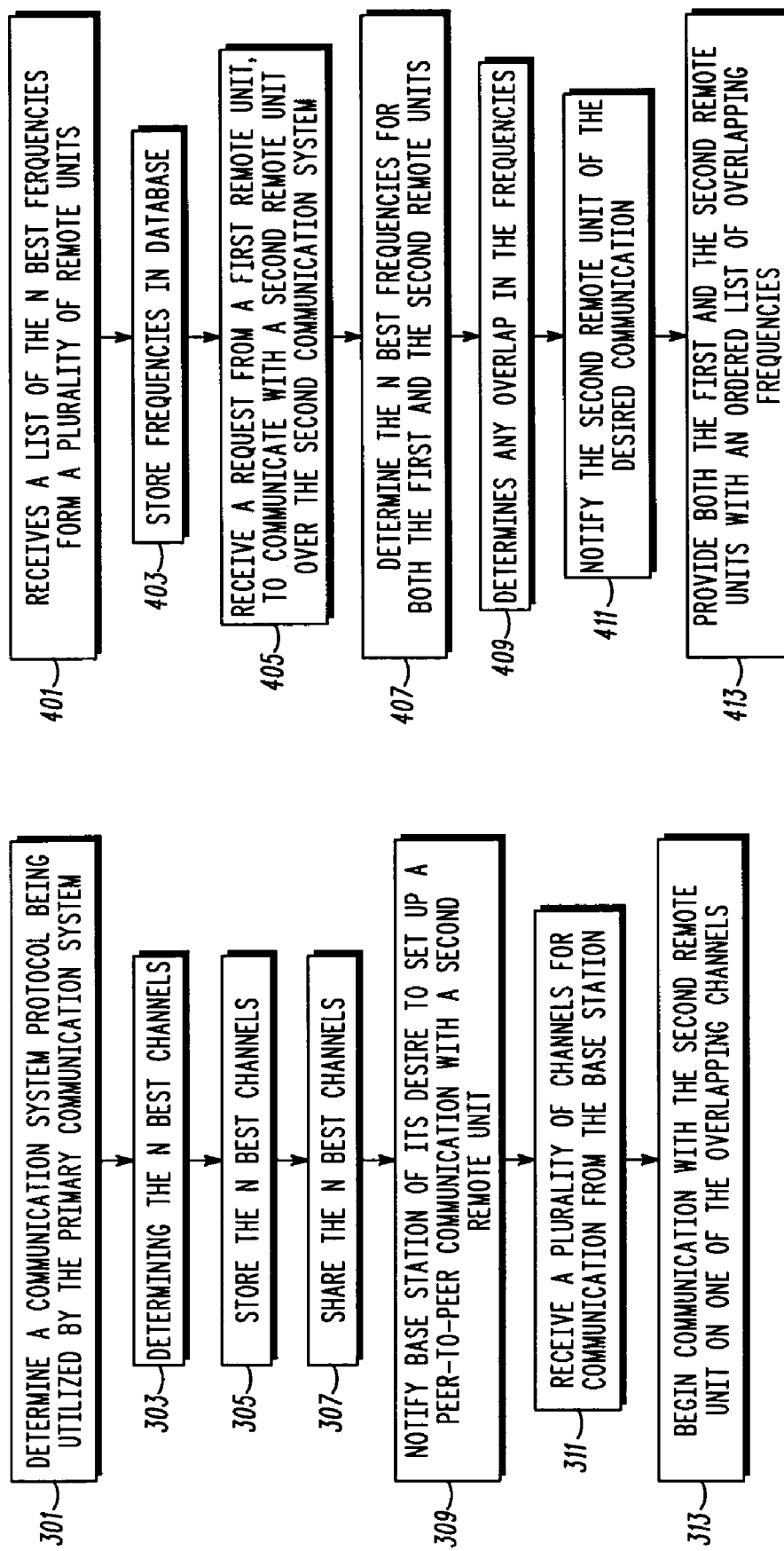

METHOD AND APPARATUS FOR CHANNEL SHARING BETWEEN MULTIPLE COMMUNICATION SYSTEMS

FIELD OF THE INVENTION

The present invention relates generally to communication systems and in particular, to a method and apparatus for channel sharing between multiple communication systems.

BACKGROUND OF THE INVENTION

Radio frequency (RF) spectrum is a scarce commodity for communications systems. Developing new communication systems is often hampered by the difficulty in allocating spectrum. A frustrating fact for the industry is that there is a lot of spectrum that exists that is only partially used because service providers with spectrum licenses do not provide (or need to provide) ubiquitous coverage. The Federal Communication Commission (FCC) of the United States has recently challenged the industry to find ways for communication systems to share the existing spectrum without impacting the each other. The difficulty of spectrum sharing is in finding ways for a secondary user (i.e., one that is not licensed to use the spectrum) to use the spectrum without interfering with the spectrum's licensee. Therefore a need exists for a method and apparatus for channel sharing between multiple communication systems in order to allow users of one communication system to use partially used spectrum from another communication system.

BRIEF DESCRIPTION OF THE DRAWINGS

FIG. 3 is a flow chart showing operation of the remote unit in accordance with the preferred embodiment of the present invention.

FIG. 4 is a flow chart showing operation of the base station in accordance with the preferred embodiment of the present invention.

DETAILED DESCRIPTION OF THE DRAWINGS

Figure 1:
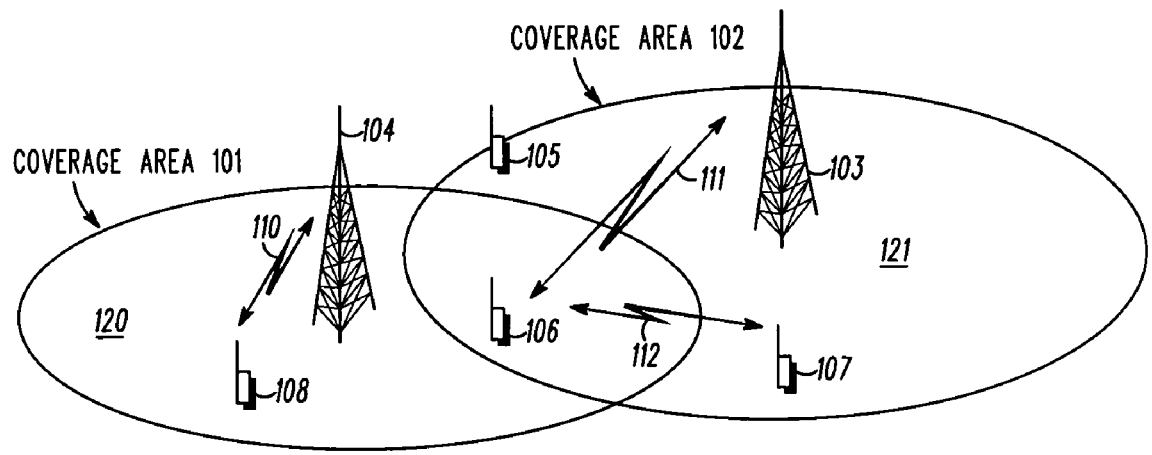
FIG. 1 is a block diagram showing multiple overlapping communication systems.

In order to address the above-mentioned need, a method and apparatus for channel sharing between multiple communication systems is provided herein. Remote units within a first, communication system utilizes frequencies (channels) from a second communication system when placing a call. When a first remote unit wants to call a second remote unit using the channels, the first remote unit sends a base station a list of top N traffic channel blocks from the second communication system along with the identity of the second remote unit. The base station then pages the second remote unit using a signaling channel reserved by second system. The second remote unit responds to the page with its list of best traffic channel blocks/chunks. The base station then picks the best overlap of idle channels from the list received by the remote units, and sends the list to the remote units instructing them use those traffic channels. Once the remote units receive the available channels, they can begin their call.

The present invention encompasses a method for channel sharing among multiple communication systems. The method comprises the steps of synchronizing a first remote unit operating within a first communication system to a second communication system and monitoring channels of the second communication system to determine activity of the channels. The activity of the channels is shared with other remote units operating within the first communication system, and, in a similar manner second activity information of the channels is received from the other remote units. Finally, a call is placed from the first remote unit to the second remote unit using a channel within the second communication system.

The present invention additionally encompasses a method of operating a first communication system. The method comprises the steps of receiving from a first remote unit, a request to place a call to a second remote unit, receiving from the first remote unit, N best channels for communication, and receiving from the second remote unit, N best channels for communication. An determination is made of the overlap in the N best channels received from the first remote unit and the N best channels received from the second remote unit, and this information is made available to the first and the second remote units.

The present invention encompasses an apparatus comprising means for synchronizing a first remote unit operating within a first communication system to a second communication system, means for monitoring channels of the second communication system to determine activity of the channels, means for sharing the activity information with other remote units operating within the first communication system, means for receiving second activity information of the channels from the other remote units, and means for placing a call from the first remote unit to the second remote unit using a frequency within the second communication system.

The present invention encompasses an apparatus comprising means for receiving from a first remote unit, an indication that a call is to be placed to a second remote unit, means for receiving from the first remote unit, N best channels for communication, means for receiving from the second remote unit, N best channels for communication, means for determining an overlap in the N best channels received from the first remote unit and the N best channels received from the second remote unit, and means for communicating to the first and the second remote units, the overlap in channels.

Finally, the present invention encompasses a base station existing within a first communication system. The base station comprises a receiver for receiving from a first remote unit, N best channels for communication, and receiving from a second remote unit, N best channels for communication, logic circuitry for determining an overlap in the N best channels received from the first remote unit and the N best channels received from the second remote unit, and a transmitter for communicating to the first and the second remote units, the overlap in channels.

Turning now to the drawings, wherein like numerals designate like components, FIG. 1 is a block diagram showing multiple overlapping communication systems 120 and 121. As shown secondary communication system 121 comprises base station 103 with remote stations 105–107, while primary communication system 120 comprises base station 104 with remote station 108. The communication systems shown can utilize any of a number of communication system protocols such as, but not limited to GSM, TDMA, IS-95, AMPS, CDMA-2000, and UMTS. Additionally, although only three remote stations 105–107, and a single remote station 104 are shown in communication with base stations 103 and 104, respectively, one of ordinary skill in the art will recognize that typical communication systems usually have many remote stations in simultaneous communication with base stations 103 and 104.

As shown the coverage areas 101 and 102 of base stations 103 and 104 are overlapping. In typical overlapping communication systems, each communication system is allowed to operate within its licensed frequency band in order not to interfere with any overlapping communication system. For example, considering remote station 106, during communication with base station 103, uplink and downlink communication signal 111 could easily be received by base station 104 and remote station 108. Similarly, direct communication between remote stations 106 and 107 via communication link 112 could easily be received by base station 104 and remote station 108. Because of this, each communication system has its own frequency band that it must operate within.

As is evident, each communication system does not provide ubiquitous coverage. That is, portions of coverage area 101 and 102 do not overlap. As discussed above, Federal Communication Commission (FCC) of the United States has recently challenged the industry to find ways for communication systems to share the existing spectrum without impacting the each other. The difficulty of spectrum sharing is in finding ways for a secondary user (i.e., one that is not licensed to use the spectrum) to use the spectrum without interfering with the spectrum's licensee. In order to address this issue in the preferred embodiment of the present invention a method and apparatus is provided for channel sharing among communication systems.

In the preferred embodiment of the present invention it is assumed that the owner of spectrum is willing to reserve/give/sell one channel (e.g., GSM frequency or CDMA code) in each cell that non-licensed users can use for signaling call setup and call maintenance information unique to the non-licensed system. In an alternate embodiment, signaling call setup and call maintenance information is accomplished using other spectrum (such as unlicensed spectrum), so that the owner of the spectrum need not reserve/give/sell one channel in each cell. It is also assumed that all communication systems are synchronized. When spectrum is needed (for example, by communication system 121) remote units 105–107 analyze transmissions from communication system 120. It should be noted that communication units 105–107 are not licensed to use spectrum used by communication system 120.

In the preferred embodiment of the present invention utilization of the channels by unlicensed (or secondary users) is reserved for low-power transmissions. For example, in a peer-to-peer network, utilization of unlicensed channels are reserved for direct, low-power, peer-to-peer transmissions between remote units. The process begins with remote units within communication system 121 monitoring transmissions from communication system 120 to determine a type of communication system protocol utilized. For example, remote units 105–107 may determine that communication system 120 utilizes a GSM system protocol. It should be noted that in order to obtain accurate channel interference information, a remote unit must be time-aligned (i.e., synchronized) to the communication system. Therefore, once the system protocol has been determined, remote units 105–107 find a control or signaling channel (e.g., a GSM Broadcast Control Channel (BCCH)) and time align to communication system 120. For example, for a GSM system, remote units 105–107 time align to the GSM superframe. In some communications systems, time alignment with the control or signaling channel also makes it possible to obtain additional information such as power constraints, traffic channel definitions, etc.

Besides periodically monitoring the reserved signaling channel for primary system 120, remote units 105–107 attempt to find the top N, (e.g., 10) least used traffic channels by measuring their signal strengths (e.g., GSM RSSI, bit error rate (BER), frame error rate (FER), . . . , etc.) and rank ordering them. Remote units 105–107 measure uplink and downlink pairs. In order to increase the allocated bandwidth between remote units 105–107, remote units 105–107 are each measuring these traffic channel RSSI's in chunks of bandwidth equivalent to multiple GSM channels since that is how the channels will be used if/when they are in a call (i.e. each measurement is over enough bandwidth to support both the secondary user's traffic bandwidth requirements plus a small amount of bandwidth for signaling with the far end of the traffic channel plus extra bandwidth to give the secondary user time to measure uplink and downlink traffic channel for RSSI above a threshold for primary system 120). For example, suppose a location area had multiple GSM frequencies. Each remote unit 105–107 measures multiple frequencies at the beginning of a timeslot. If more than one frequency was unutilized, the bandwidth allocation could be increased for remote units 105–107 to communicate traffic data. Minimizing inadvertent interference to the primary user (i.e., users within communication system 120) may be enhanced by either utilizing techniques used in military equipment to detect signals below the noise floor or avoiding non-full duplex channels and measuring transmissions from both ends of full-duplex links.

When remote unit 106 wants to call remote unit 107 (peer-to-peer), remote unit 106 sends base station 103 a list of top 10 traffic channel blocks along with the identity of remote unit 107. Base station 103 then determines the location area of remote unit 107. Assuming base station 103 is providing coverage for both remote units 106–107, and assuming that remote units 106–107 are within signaling range of each other, base station 103 pages remote unit 107 using the signaling channel reserved by primary system 120. Remote unit 107 responds to the page with its list of best traffic channel blocks/chunks. Base station 103 then picks the best overlap of idle channels from the list received by remote units 106 and 107, and sends the list to remote units 106 and 107 instructing them use those traffic channels. This list is organized in the order that base station 103 wants each remote unit to use them. If the secondary communication system 121 employs frequency hopping to mitigate interference, base station 103 may also specify a frequency hopping sequence to be used by remote units 106–107.

Once remote units 106–107 receive the available channels, they can begin their call. On each frame, each mobile will first measure the channel (uplink and downlink) and compare against an interference threshold. If the measurement is above the threshold, then the signaling part of the traffic channel will be used for remote unit 106 to convey to remote unit 107 (or visa versa) that the next channel should be used. Since remote unit 105 is also measuring traffic channel frequencies to find the most unused, it may provide remote units 106–107 with additional unused channels via the reserved signaling channel in the event that remote units 106–107 exhaust their list of traffic channels to use. If the measurements performed by remote units 106–107 of their current traffic channel are below the interference threshold, the two continue to use the traffic channel to deliver their respective traffic data. However if the measurements performed by remote units 106–107 of their current traffic channel are above the interference threshold, the two remote units must find another channel to continue their communication.

If the distance between remote units 106 and 107 requires an intermediate relay to keep the transmit power low, then other idle mobiles or fixed relay nodes in the vicinity could also provide base station 103 info about the status of the primary system's traffic channel RSSI levels. So that these intermediary nodes are not constantly burning battery to communicate this information to base station 103, when base station 103 determines that other nodes could serve as intermediaries, base station 103 pages them to awaken them to provide this traffic channel RSSI information. Base station 103 then uses this additional information and the identity of these intermediate nodes to set up a multi-hop connection. Base station 103 can even take part in helping identify the best route between source and target as well as the best channel for each relay segment along the multi-hop end-to-end connection.

This above procedure will also work for a primary system employing a code division, multiple access (CDMA) system protocol, but several changes must be made since CDMA operates with codes to distinguish one user from another and that all users are already sharing a single carrier (frequency). This requires the secondary user (i.e., non licensed) to work within a maximum noise budget that will not adversely affect primary system 120. Therefore, the secondary user computes the impact it will have on the primary CDMA user based on its desired bandwidth requirements. Based on the desired transmit power level, it assesses the amount of bandwidth it can allocate by computing the impact to the overall noise level that various channel rates and spreading factors will contribute. For example, when remote units within communication system 121 monitor transmissions from communication system 120 and determine that the type of communication system protocol being utilized is a CDMA system protocol, each remote unit will measure the noise level that exists due to the simultaneous use of the channel by the primary system's users. In addition, each user will correlate with possible orthogonal codes to determine which codes are currently in use. When remote unit 106 desires to call remote unit 107 (peer-to-peer), remote unit 106 sends base station 103 a list of up to 10 traffic channel orthogonal codes along with the identity of remote unit 107. Once remote units 106 and 107 are established in a call, if one of the two units in the call detects that this noise threshold will be exceeded by its transmission, it will communicate with the other user of the need to use a lower power or a lower data rate or higher spreading factor to fit within the noise budget. If those actions cannot be taken, it is also possible to switch to an alternate carrier that is operating below the noise threshold.

In an alternate embodiment of the present invention a database existing in the remote units or base stations is kept, and contains secondary channel information based on approximate GPS location. This database could further assist the subscribers to more quickly learn how the spectrum is being used and how to efficiently measure the channels in a way that synchronizes measurements between secondary users. This database could also remove the need for the subscriber to decode the primary user's signaling channel to learn of details such as channel definitions, power constraints, etc.

In summary, the following steps are taken for users wishing to communicate in a peer-to-peer fashion.
1) A remote unit determines the communication system protocol (e.g. GSM, IS-95, etc) for the primary (or licensed) system to determine channel frame and usage information transmitted by the primary user. The remote unit is flexible enough to work within any cellular spectrum and is capable of syncing up to the primary communication system to become frame aligned and even obtain information from that system such as the maximum mobile transmit power.
2) The remote unit uses wider channel than that used by the primary system to have room to simultaneously measure inactivity of primary user's channel before using it
3) Multiple remote units help each other measure channels to find groups of free channels and exchange knowledge between the remote units by using a reserved signaling channel provided by the primary user for exclusive use by secondary users.
4) The system architecture contains base stations, or ad-hoc Network agents, that enable a secondary subscriber or external user to reach another secondary user using the primary user's reserved signaling channel. For example, a base station helps coordinate call set up and channel allocation between remote units.
5) Remote units frequency hop between identified free channels (or equivalent to hop to stay away from interference).
6) The system architecture may contain fixed relay nodes to help reduce the number of base stations, thus enabling multi-hop connections. Sleeping fixed relays (or idle users) are awakened to help measure channels and forward discovery/paging messages and to help base stations set up peer to peer network:
   Remote units register with fixed relays and/or base stations.
   Fixed relays forward pages if no page acknowledgment (ACK) to call source within time X or if page is repeated within time Y.

Figure 2:
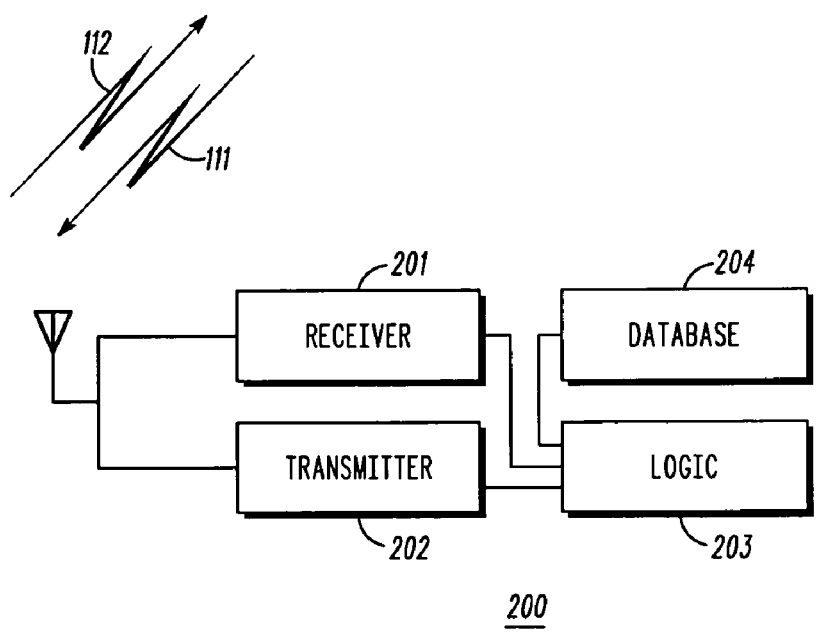
FIG. 2 is a bock diagram of a transceiver in accordance with the preferred embodiment of the present invention.

FIG. 2 is a high-level block diagram of transceiver 200 in accordance with the preferred embodiment of the present invention. The transceiver shown in FIG. 2 can function as a base station or a remote or mobile unit. As shown, transceiver 200 comprises both receiver 201 and transmitter 202. Both receiver 201 and transmitter 202 are controlled by logic circuitry 203 and are capable of operation utilizing multiple communication system protocols. In the preferred embodiment of the present invention logic circuitry 203 comprises a microprocessor/controller such as, but not limited to a Motorola PowerPC microprocessor. Additionally, transceiver 200 comprises database 204. Database 204 serves as means to store channel information, and comprises random access memory (RAM) or standard disk-drive memory.

FIG. 3 is a flow chart showing operation of the remote unit in accordance with the preferred embodiment of the present invention. In particular, the logic flow of FIG. 3 illustrates those steps necessary for a remote unit to initiate a call to a second remote unit utilizing a frequency outside of its licensed frequency band. In other words, the logic flow that follows shows steps necessary for a secondary (unlicensed communication system) to initiate a call on a channel of a primary communication system (licensed). The logic flow begins at step 301 where receiver 201 and logic circuitry 203 determine a communication system protocol being utilized by the primary communication system. In particular, transceiver 200 has a priori knowledge of each possible primary communication system that it may attempt to share spectrum with (e.g. details of frequency bands, channel structure, modulation schemes, etc. are known for GSM, IS-95, etc.). In the preferred embodiment of the present invention this is stored in database 204. Additionally, receiver 201 serves as means for synchronizing with the primary communication system as is well known in the art. For example, with a priori knowledge of the GSM SCH (synchronization channel) frequency, receiver 201 can monitor the SCH channel for the repetitive synchronization bursts and train its phase lock loop to the training sequence on that channel. Once synchronization with this channel is accomplished, then additional information can be decoded from additional logical channels such as the BCCH.

After synchronizing with the primary communication system, receiver 201 monitors the channels being transmitted from the primary communication system and communicates this information to logic circuitry 203. Logic circuitry 203 serves as means for determining the N best channels (e.g., N best frequencies, timeslots, orthogonal codes, . . . etc.) for communication as perceived by receiver 201 (step 303). As discussed above, the N best channels comprise the N channels having a least amount of interference (activity), and thus are the best candidates for utilizing when placing a call. Once determined, logic circuitry 203 stores the N best channels in database 204 (step 305) and shares them among other remote units within the secondary communication system (step 307). This is accomplished by utilizing transmitter 202 to transmit the N best channels to a base station, where they are stored and transmitted to other remote units within the secondary communication system. The other remote units store the N best channels, along with the remote unit's identity that recorded the interference readings. It should be noted that in a similar manner, the remote unit continuously receives interference readings of the primary communication system's channels transmitted from other remote units (as perceived by the other remote units). Thus, each remote unit within the first communication system shares activity information with other remote units operating within the first communication system. The activity information comprises activity (interference) of channels existing within a second communication system.

Logic circuitry 203 then contacts a base station and notifies the base station of its desire to set up a peer-to-peer communication with a second remote unit (step 309). The base station then notifies the second remote unit, determining any overlapping frequencies, and instructs communication to take place on a plurality of channels. Thus, at step 311, the remote unit receives a plurality of channels for communication from the base station, and at step 313, communication begins with the second remote unit on one of the overlapping channels. More particularly, the base station accesses its database to determine the N best channels for each of the remote units involved in the call, and decides if any of the channels overlap. If so, the overlapping channels are provided to the remote units in a particular order (best to worst interference) and the remote units initiate communications utilizing the best channels (frequency, code, timeslot, . . . etc.) prior to attempting other channels.

FIG. 4 is a flow chart showing operation of the base station in accordance with the preferred embodiment of the present invention. As discussed above, the base station exists within a first communication system and maintains database 204 comprising a list of remote units, along with their associated N best frequencies for communication within a second communication system. The logic flow begins at step 401 where receiver 201 receives a list of N best frequencies from a plurality of remote units. As discussed above, the N best frequencies, or channels, comprises N best frequencies as perceived by each of the plurality of remote units for communication on a second communication system. At step 403, these frequencies passed to logic circuitry 203 and are stored in database 204. At step 405, the receiver 201 receives a request from a first remote unit, to communicate with a second remote unit over the second communication system. Logic circuitry 203 is notified and accesses database 204 to determine the N best frequencies for both the first and the second remote units (step 407), and determines any overlap in the frequencies (step 409). At step 411, logic circuitry 203 (via transmitter 202) notifies the second remote unit of the desired communication and provides both the first and the second remote units with an ordered list of overlapping frequencies (step 413).

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for channel sharing among multiple communication systems, the method comprising the steps of:
   synchronizing a first remote unit operating within a first communication system to a second communication system;
   monitoring channels of the second communication system to determine activity of the channels;
   sharing the activity of the channels with other remote units operating within the first communication system;
   receiving second activity information of the channels from the other remote units; and
   placing a call from the first remote unit to the second remote unit using a channel within the second communication system, wherein the step of monitoring channels of the second communication system comprises the step of monitoring the channels to determine N best channels for communication as perceived by the first remote unit, wherein the N best channels comprise N best channels taken from the group consisting of frequencies, timeslots, and orthogonal codes.

2. The method of claim 1 wherein the step of placing the call comprises the step of placing a peer-to-peer call from the first remote unit to the second remote unit.

3. The method of claim 1 wherein the step of sharing the activity of the channels comprises the step of sharing the N best channel information with other remote units.

4. The method of claim 3 wherein the step of receiving second activity information comprises the steps of receiving N best channel information from the other remote units, as perceived by the other remote units.

5. The method of claim 4 wherein the step of placing the call comprises the step of placing the call using a channel (frequency, code, timeslot, . . . etc.) chosen from overlapping channels from the shared N best channels and received N best channels from the second remote unit.

6. The method of claim 1 wherein the step of monitoring channels of the second communication system comprises the step of monitoring the channels of the second communication system to determine an interference level.

7. A method of operating a first communication system, the method comprising the steps of:
   receiving from a first remote unit, a request to place a call to a second remote unit;
   receiving from the first remote unit, N best channels for communication;
   receiving from the second remote unit, N best channels for communication;

determining an overlap in the N best channels received from the first remote unit and the N best channels received from the second remote unit, wherein the N best channels received from the first remote unit comprise N best channels taken from the group consisting of frequencies, timeslots, and orthogonal codes and wherein the N best channels received from the second remote unit comprise N best channels taken from the group consisting of frequencies, timeslots, and orthogonal codes; and communicating to the first and the second remote units, the overlap in channels.

8. The method of claim 7 wherein the step of receiving from the first remote unit, an indication that the call is to be placed to the second remote unit comprises the step of receiving from the first remote unit, an indication that the call is to be placed to the second remote over a second communication system.

9. The method of claim 8 wherein the step of receiving from the first remote unit, N best channels for communication, comprises the step of receiving the N best channels for communication on the second communication system.

10. The method of claim 9 wherein the step of receiving from the second remote unit, N best channels for communication comprises the step of receiving the N best channels for communication on the second communication system.

11. The method of claim 7 wherein the step of communication to the first and the second remote units, the overlap in channels comprises the step of communicating the overlap in channels causing the first remote unit to set up a peer-to-peer call to the second remote unit utilizing a channel chosen from the overlapping channels.

12. The method of claim 7 wherein the step of receiving from the first remote unit, N best channels comprises the step of receiving a list of N best channels having a least amount of interference as perceived by the first remote unit.

13. The method of claim 12 wherein the step of receiving from the second remote unit, the N best channels comprises the step of receiving a list of N best channels having a least amount of interference as perceived by the second remote unit.

14. An apparatus comprising:
means for synchronizing a first remote unit operating within a first communication system to a second communication system;
means for monitoring channels of the second communication system to determine activity of the channels;
means for sharing the activity information with other remote units operating within the first communication system;
means for receiving second activity information of the channels from the other remote units; and
means for placing a call from the first remote unit to the second remote unit using a frequency within the second communication system, wherein the means for monitoring channels of the second communication system comprises a means for monitoring the channels to determine N best channels for communication as perceived by the first remote unit, wherein the N best channels comprise N best channels taken from the group consisting of frequencies, timeslots, and orthogonal codes.

15. An apparatus comprising:
means for receiving from a first remote unit, an indication that a call is to be placed to a second remote unit;
means for receiving from the first remote unit, N best channels for communication;
means for receiving from the second remote unit, N best channels for communication;
means for determining an overlap in the N best channels received from the first remote unit and the N best channels received from the second remote unit, wherein the N best channels received from the first remote unit comprise N best channels taken from the group consisting of frequencies, timeslots, and orthogonal codes and wherein the N best channels received from the second remote unit comprise N best channels taken from the group consisting of frequencies, timeslots, and orthogonal codes; and
means for communicating to the first and the second remote units, the overlap in channels.

16. A base station existing within a first communication system, the base station comprising:
a receiver for receiving from a first remote unit, N best channels for communication, and receiving from a second remote unit, N best channels for communication, wherein the N best channels received from the first remote unit comprise N best channels taken from the group consisting of frequencies, timeslots, and orthogonal codes and wherein the N best channels received from the second remote unit comprise N best channels taken from the group consisting of frequencies, timeslots, and orthogonal codes;
logic circuitry for determining an overlap in the N best channels received from the first remote unit and the N best channels received from the second remote unit; and
a transmitter for communicating to the first and the second remote units, the overlap in channels.

17. The base station of claim 16 wherein the communication to the first and the second remote units causes the first remote unit to setup a peer-to-peer call to the second remote unit on a channel used by a second communication system, wherein the channel is chosen from the overlapping channels.

* * * * *